United States Patent
Danichev et al.

(10) Patent No.: US 10,866,939 B2
(45) Date of Patent: Dec. 15, 2020

(54) ALIGNMENT AND DEDUPLICATION OF TIME-SERIES DATASETS

(71) Applicant: ENTIT SOFTWARE LLC, Sunnyvale, CA (US)

(72) Inventors: Pavel Danichev, Yehud (IL); Lioz Medina, Yehud (IL); Fernando Vizer, Yehud (IL)

(73) Assignee: MICRO FOCUS LLC, Santa Clara, CA (US)

( * ) Notice: Subject to any disclaimer, the term of this patent is extended or adjusted under 35 U.S.C. 154(b) by 229 days.

(21) Appl. No.: 15/778,459

(22) PCT Filed: Nov. 30, 2015

(86) PCT No.: PCT/US2015/062991
§ 371 (c)(1),
(2) Date: May 23, 2018

(87) PCT Pub. No.: WO2017/095374
PCT Pub. Date: Jun. 8, 2017

(65) Prior Publication Data
US 2018/0357261 A1   Dec. 13, 2018

(51) Int. Cl.
| | | |
|---|---|---|
| *G06F 16/00* | (2019.01) | |
| *G06F 16/215* | (2019.01) | |
| *G06F 16/22* | (2019.01) | |
| *G06F 16/23* | (2019.01) | |
| *G06F 17/40* | (2006.01) | |
| *G06F 11/07* | (2006.01) | |

(52) U.S. Cl.
CPC ........ *G06F 16/215* (2019.01); *G06F 11/0709* (2013.01); *G06F 11/0751* (2013.01); *G06F 16/2291* (2019.01); *G06F 16/2372* (2019.01); *G06F 17/40* (2013.01)

(58) Field of Classification Search
CPC ............... G06F 16/215; G06F 11/0751; G06F 11/0709; G06F 17/40
See application file for complete search history.

(56) References Cited

U.S. PATENT DOCUMENTS

| | | | | |
|---|---|---|---|---|
| 7,716,011 B2 * | 5/2010 | Thibaux | .............. | H04L 63/1425 702/179 |
| 8,051,162 B2 | 11/2011 | Arlitt et al. | | |
| 8,286,237 B2 | 10/2012 | Moghe et al. | | |
| 8,375,255 B2 | 2/2013 | Wang et al. | | |

(Continued)

FOREIGN PATENT DOCUMENTS

WO    WO2014120161 A1    8/2014

OTHER PUBLICATIONS

International Searching Authority., International Search Report and Written Opinion dated Jul. 26, 2016 for PCT Application No. PCT/US2015/062991, filed Nov. 30, 2015, 14 pages.

(Continued)

*Primary Examiner* — Leslie Wong (57) ABSTRACT

In some examples, time-series datasets received from a system may be temporally aligned. In some examples, one of the time-series datasets may be deduplicated. In some examples, whether an anomaly has occurred in the system may be determined based on a non-deduplicated time-series dataset of the time-series datasets.

20 Claims, 4 Drawing Sheets

(56) References Cited

U.S. PATENT DOCUMENTS

| | | | | |
|---|---|---|---|---|
| 8,611,219 | B2* | 12/2013 | Golic | H04L 43/022 |
| | | | | 370/235 |
| 9,407,652 | B1* | 8/2016 | Kesin | G06N 7/005 |
| 9,565,203 | B2* | 2/2017 | Bernstein | H04L 63/1441 |
| 9,632,858 | B2* | 4/2017 | Sasturkar | G06F 16/24578 |
| 9,652,354 | B2* | 5/2017 | Filimonov | G06F 11/3409 |
| 10,027,689 | B1* | 7/2018 | Rathor | G06F 11/3006 |
| 10,181,987 | B2* | 1/2019 | Gandham | G06F 16/17 |
| 10,216,776 | B2* | 2/2019 | Tsirulnik | G06F 16/221 |
| 2004/0250124 | A1* | 12/2004 | Chesla | G06F 21/552 |
| | | | | 726/13 |
| 2011/0185234 | A1 | 7/2011 | Cohen et al. | |
| 2012/0137367 | A1* | 5/2012 | Dupont | G06F 21/00 |
| | | | | 726/25 |
| 2012/0197852 | A1 | 8/2012 | Dutta | |
| 2012/0197911 | A1* | 8/2012 | Banka | H04L 67/12 |
| | | | | 707/752 |
| 2013/0304909 | A1 | 11/2013 | Pappu et al. | |
| 2014/0096249 | A1 | 4/2014 | Dupont | |
| 2014/0149273 | A1 | 5/2014 | Angell et al. | |
| 2014/0181968 | A1* | 6/2014 | Ge | H04L 63/1416 |
| | | | | 726/23 |
| 2014/0214763 | A1 | 7/2014 | Haas et al. | |
| 2014/0230062 | A1* | 8/2014 | Kumaran | G06F 21/554 |
| | | | | 726/24 |
| 2014/0324862 | A1 | 10/2014 | Bingham et al. | |
| 2015/0033305 | A1* | 1/2015 | Shear | G06F 21/45 |
| | | | | 726/6 |
| 2015/0142935 | A1 | 5/2015 | Srinivas | |
| 2015/0212868 | A1 | 7/2015 | Chen | |
| 2016/0234167 | A1* | 8/2016 | Engel | H04L 63/1408 |
| 2016/0253598 | A1* | 9/2016 | Yamada | G06N 20/00 |
| | | | | 706/12 |
| 2016/0350173 | A1* | 12/2016 | Ahad | G06F 11/3409 |
| 2016/0359704 | A1* | 12/2016 | Gandham | H04L 41/16 |
| 2016/0381068 | A1* | 12/2016 | Galula | H04L 63/123 |
| | | | | 726/23 |
| 2017/0011098 | A1 | 1/2017 | Tsirulnik et al. | |
| 2017/0063886 | A1* | 3/2017 | Muddu | G06F 3/04842 |
| 2018/0324199 | A1* | 11/2018 | Crotinger | G06F 17/18 |

OTHER PUBLICATIONS

Li, W. et al., Unraveling Complex Temporal Associations in Cellular Systems Across Multiple Time-series Microarray Datasets, (Research Paper), Aug. 2010, 11 Pages.

Nychis, G., Sekar, V., Andersen, D. G., Kim,H., & Zhang, H. (Oct. 2008). An empirical evaluation of entropy-based traffic anomaly detection. In Proceedings of the 8th ACM SIGCOMM conference on Internet measurement (pp. 151-156), ACM.

Pandria, N. et al., Testing the Correlation of Time Series Using Dynamic Time Warping, (Research Paper), Apr. 24, 2014, 25 Pages.

Shyu, M. L., Chen, S. C., Sarinnapakorn, K., & Chang, L. (2003). A novel anomaly detection scheme based on principal component classifier. Miami Univ Coral Gables FL Dept of Electrical and Computer Engineering.

HP, "Operations Analytics", Jun. 8, 2014, 7 pages, <http://web.archive.org/web/20140608134239/http://www8.hp.com/us/en/software-solutions/operations-analytics-operations-anal.

WikiPedia, "Anomaly detection", Aug. 19, 2014, 4 pages <http://web.archive.org/web/20140819105433/https://en.wikipedia.org/wiki/Anomaly_detection>.

WikiPedia, "Correlation function", Sep. 23, 2014, 3 pages. <http://web.archive.org/web/20140923235406/https://en.wikipedia.org/wiki/Correlation_function>.

* cited by examiner

ALIGNMENT AND DEDUPLICATION OF TIME-SERIES DATASETS

BACKGROUND

In some examples, monitoring a system such as a computer network may involve obtaining and analyzing data from a variety of sources in the system. For example, a computer network such as a data center may include thousands of computer systems and network devices that interconnect the computer network applications running on the network, and the like.

BRIEF DESCRIPTION

Some examples are described with respect to the following figures.

DETAILED DESCRIPTION

The following terminology is understood to the following when recited by the specification or the claims. The singular forms "a", "an," and "the" mean "one or more." The terms "including" and "having" are intended to have the same inclusive meaning as the term "comprising."

As understood herein, a "time-series dataset" comprises multiple values each of which is associated with its own time stamp. For example, a time-series dataset may be implemented as a two column array of numbers, with one column populated by a sequence of time stamps, and the other populated with a set of values measured and/or obtained at each of those time stamps.

In some examples, monitoring a system such as a computer network may involve obtaining and analyzing time-series data from a variety of sources in the system. For example, in a computer network, system components may have sensors that measure physical parameters such as ambient temperature, on-chip temperature, fan speeds, etc. Such components may generate diagnostic reports or metrics related to performance such as logs of network throughput, CPU utilization, memory utilization, CPU speed, etc. In other examples, other types of systems may be analyzed and other type of data may be obtained.

The time series data may then be sent to monitoring and/or analysis systems as time-series datasets. In some examples, real time streams of time-series datasets may be used to determine whether the computer network is exhibiting an anomaly, for example an anomaly affecting performance of the computer network. The root cause of the anomaly may then be diagnosed to facilitate resolution as soon as possible. The anomaly determination and root cause analysis may be performed automatically by the monitoring and/or analysis system, or manually by the network administrator (or others responsible for large computer networks and other complex systems) using the monitoring and/or analysis system.

However, in some examples, different time-series datasets may represent the same metric, in some cases unbeknownst to the network administrator and the monitoring and/or analysis system. For example, two different applications may measure the same metric, such as the same CPU utilization of the same host. In some examples, different time-series datasets may measure reciprocal metrics, for example one metric representing used memory and another metric representing free memory. Therefore, in some examples, a determination of whether an anomaly has occurred in the system based on whether any metrics of the system are exhibited abnormal behavior may be performed incorrectly, as the number of metrics exhibiting abnormal behavior may be overestimated.

Moreover, in some examples, the time-series datasets may not be temporally aligned with one another, causing difficulty in identification of multiple datasets representing the same metric. Datasets may be misaligned, for example, because different data sources may have different aggregation intervals and/or different aggregation offsets. Moreover, some datasets may have missing data points perhaps due to faulty sensor(s), faulty communication link(s), and/or other issues. Further, some datasets may not include periodically spaced data such that subsequent time stamps are separated by a regular time spacing. For instance, some sources of diagnostically relevant information may cause reports, logs, or the like generated upon the occurrence of particular events and/or satisfaction of particular conditions. As a consequence, the multitude of time-series datasets available for analysis may not have a sequence of identical time stamps.

Accordingly, the present disclosure provides examples in which the time-series datasets may be aligned and then using the aligned data, deduplicated so that, for example, time-series datasets representing the same metric or reciprocal metrics are not both used when determining whether an anomaly has occurred. Instead, an anomaly may be determined based on measurements of, for example, unique metrics such as CPU utilization, memory utilization, disk input/output, etc. In this way, the network administrator and monitoring and/or analysis system may more effectively and efficiently identify and resolve anomalies.

Figure 1:
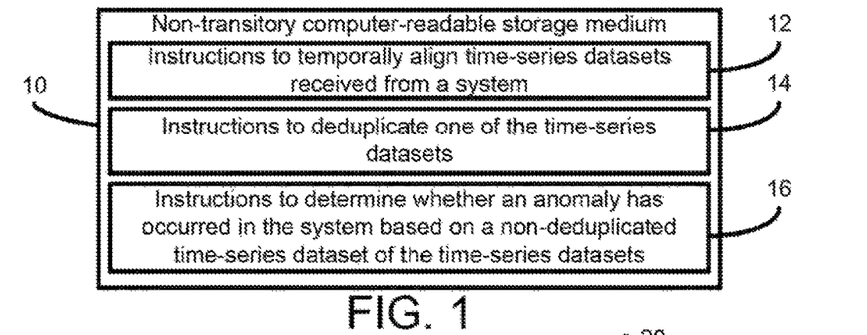
FIG. 1 a block diagram illustrating-transitory computer readable storage medium according to some examples.

FIG. 1 is a block diagram illustrating a non-transitory computer readable storage medium 10 according to some examples. The non-transitory computer readable storage medium 10 may include instructions 12 executable by a processor to temporally align time-series datasets received from a system. The non-transitory computer readable storage medium 10 may include instructions 14 executable by a processor to deduplicate one of the time-series datasets. The non-transitory computer readable storage medium 10 may include instructions 16 executable by a processor to determine whether an anomaly has occurred in the system based on a non-deduplicated time-series dataset of the time-series datasets.

Figure 2:
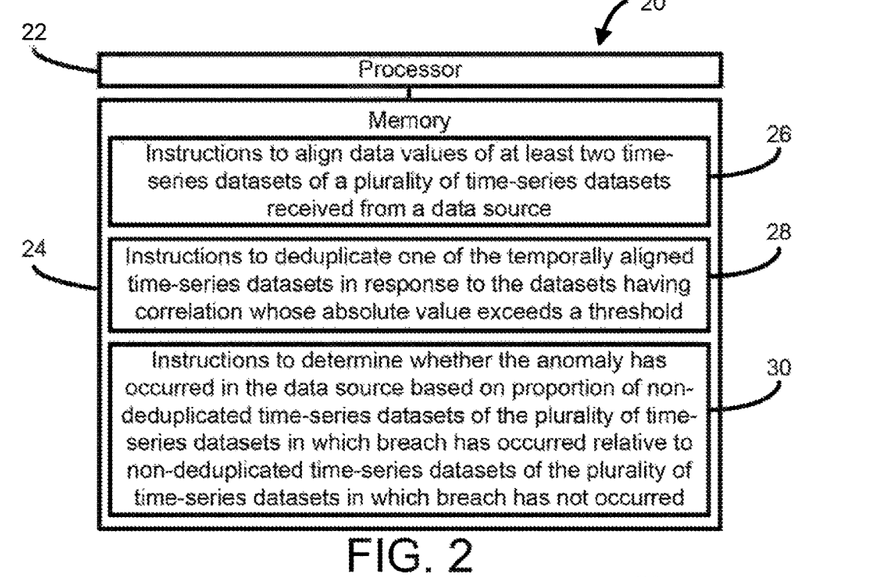
FIGS. 2 and 4 are block diagrams illustrating systems according to some examples.

FIG. 2 is a block diagram illustrating a system 20 according to some examples. The system 20 may include a processor 22 and a memory 24. The memory 24 may include instructions 24 executable by the processor to align data values of at least two time-series datasets of a plurality of time-series datasets received from a data source. The memory 24 may include instructions 26 executable by the processor to deduplicate one of the temporally aligned time-series datasets in response to the two temporally aligned time-series datasets having a correlation whose absolute value exceeds a correlation threshold. The memory 24 may include instructions 28 executable by the processor to determine whether the anomaly has occurred in the data source based on a proportion of non-deduplicated time-series datasets of the plurality of time-series datasets in which a breach has occurred relative to non-deduplicated time-series datasets of the plurality of time-series datasets in which the breach has not occurred.

Figure 3:
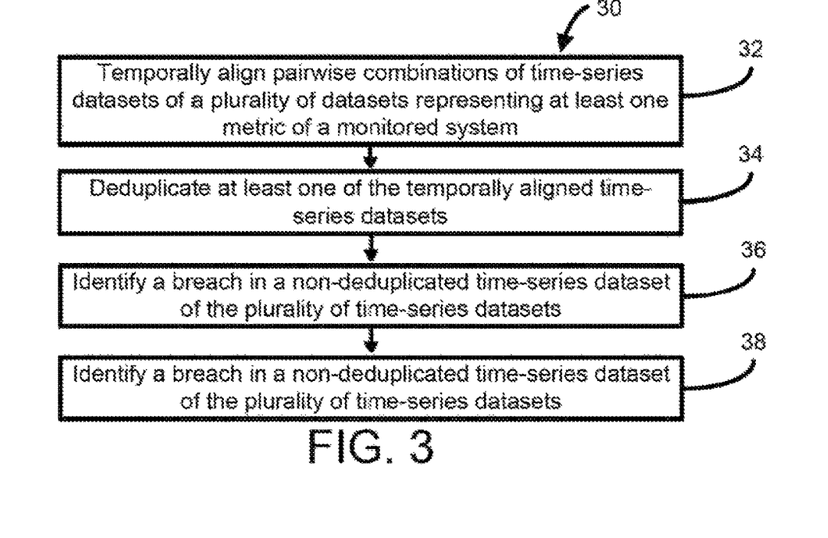
FIGS. 3, 5, and 6 flow diagram illustrating methods according to some examples.

FIG. 3 is a flow diagram illustrating a method 30 according to some examples. At 32, pairwise combinations of time-series datasets of a plurality of datasets representing least one metric of a monitored system may be temporally aligned. At 34, at least one of the temporally aligned time-series datasets may be deduplicated. At 36, a breach in a non-deduplicated time-series dataset of the plurality of time-series datasets may be identified. At 38, an anomaly associated with the at least one metric of the monitored system may be identified based on the breath.

Figure 4:
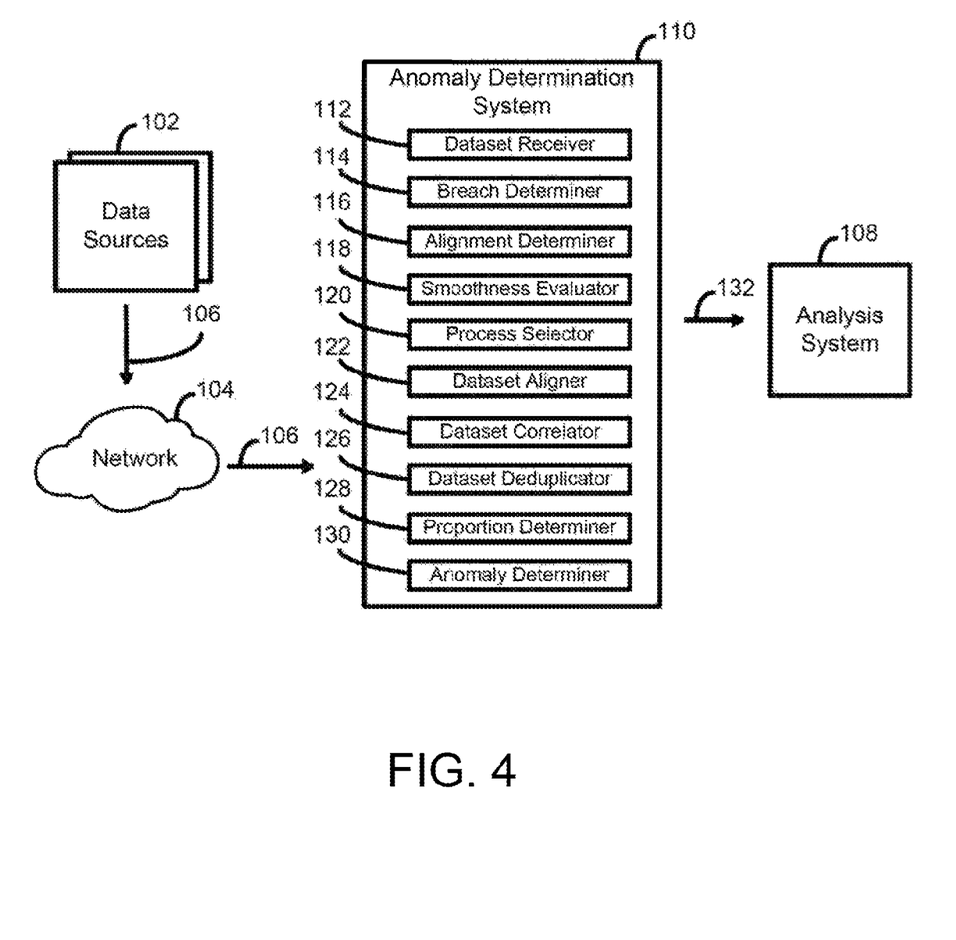

FIG. 4 is a block diagram illustrating a system 100 according to some examples. The system 100 includes data sources 102, communication network 104, anomaly determination system 110, and analysis system 108. The anomaly determination system 110 may include a several components including dataset receiver 112, breach determiner 114, alignment determiner 116, smoothness evaluator 118, process selector 120, dataset aligner 122, correlation determiner 124, dataset deduplicator 126, proportion determiner 128, and anomaly determiner 130. In some examples, these components of the anomaly determination system 110 may be implemented as a computing system including a processor, a memory such as non-transitory computer readable medium coupled to the processor, and instructions such as software and/or firmware stored in the non-transitory computer-readable storage medium. The instructions may be executable by the processor to perform processes defined herein. In some examples, the components may include hardware features to perform processes described herein, such as a logical circuit, application specific integrated circuit, etc. In some examples, multiple components lay be implemented using the same computing system features or hardware.

The data sources 102 may, for example, comprise a group of networked computing systems such as servers in a data center, and/or may comprise components of the same computing system or multiple computing systems. Each of the computing systems may include sensors and/or status reporting modules that measure parameters of the computing systems such as parameters related to system performance. In some examples, the computing systems may generate logs and/or metrics related to system performance (e.g., memory utilization, CPU speed or utilization, network bandwidth, etc.) In other examples, the data sources 102a-b may comprise any other sources of data.

The dataset receiver 112 may receive time-series datasets 106 from the data sources 102a-b, which may transmit the time-series datasets 106 via the communication network 104 to the anomaly determination system 110 via, for example, a communication interface which may be part of the anomaly determination system 110. The time-series datasets 106 which may, for example, be indicative of metrics, sensor measurements, and/or other information related to system performance of the data sources 102a-b.

The network 104 may for example, be a local area network (LAN), wide area network (WAN), the Internet, or any other network. In some examples, the network 104 may comprise components of an information technology (IT) infrastructure of an organization. The communication interface of the anomaly determination system 110 may include a network interface card (NIC) or another component to receive signals from a communication path, demodulate and/or decode the data from the signals, and/or apply error correction to retrieve data packet(s), header information, etc. in accordance with various communication protocols. The communication interface may also send data to another terminal by generating data packets, header information, and so forth; encoding and/or modulating a signal based on the data to be communicated; and transmitting the signal. Moreover, the communication interface may perform decryption and encryption to facilitate secure communications according to various standards and protocols.

The breach determiner 114 may, for each of the received time-series datasets 106, determine whether a breach has occurred in the time-series dataset 106. A "breach" is understood herein to have occurred in a data source when a data value in a time-series dataset associated with a data source is outside a predetermined range of data values. The predetermined range may, for example, be based on historical data representing expected data values for a given metric. In some examples, the range may be a range of [mean minus 3 standard deviations, mean plus 3 standard deviations], wherein the mean represents historical data values associated with the given metric averaged over a time interval such as the preceding one month. In some examples, a breach may instead be understood to occur when multiple data values in a time-series dataset (e.g., consecutive data values in a time-series dataset) are outside the predetermine range of data values. In an example, multiple data values or consecutive data values may be used to indicate a breach to reduce the probability that a single outlier data value that may falsely represent an anomaly is not used.

The alignment determiner 116 may determine whether two of the time-series datasets 106 which have not been deduplicated by the dataset deduplicator 126 are temporally aligned. As understood herein, "temporal alignment" is when time stamps in time-series datasets have same time values within a particular time interval. For example, if each of the time-series datasets have three time stamps (each of which are associated with respective data values), then these time series datasets are aligned if the three time stamps in the first time-series dataset have the same time values as the three time steps in the second time-series dataset. In some examples, the time-series datasets may not be temporally aligned if, within a selected time interval in the time-series datasets 106 one of the time-series datasets 106 contains a time stamp with a time value that is not equal to any time value in a time stamp of the other of the time-series datasets 106.

The alignment determiner 116 may perform the determination for each "pairwise combination of time-series datasets" which is defined herein to include any combination of two different time-series datasets. Different permutations are not included. For example, {time-series dataset 1, time-series dataset 2} and {time-series dataset 2, time-series dataset 1} are two pairwise permutations but one pairwise combination. In an example, it there are 10 time-series datasets, then there may be $n!/[k(n-k)!]=45$ pairwise combinations, where $k=2$ represents two time-series datasets in each pair. In some examples, if a time-series dataset is already deduplicated before being compared to each of the other time-series datasets to alignment determination is made, then the number of alignment determinations may be fewer than the number of pairwise combinations generated from the set of the received time-series datasets 106.

In some examples, rather than determining temporal alignment for each pairwise combination of the received time-series datasets 106, the alignment determiner 116 may instead determine temporal alignment of each pairwise combination of time-series datasets in which breaches occurred in both time-series datasets of the pairwise combination, and may not determine temporal alignment of pairwise combinations of time-series datasets if a breach did not occur in at least one of the two time-series datasets. For example, if 4 of 10 time-series datasets have breaches, then the alignment determiner 116 may determine temporal alignment for the 6 pairwise combinations of the 4 time-series datasets, assuming none of the 4 time-series datasets are deduplicated before the alignment determination is performed.

If the alignment determiner 116 determines that two time-series dataset are not aligned, then the smoothness evaluator 118, process selector 120, and dataset aligner 122 may be used to temporally align the time-series datasets.

The smoothness evaluator 118 may determine a degree of smoothness of the two time-series datasets of a given pairwise combination. The smoothness evaluator 118 may perform an analysis on each time-series dataset that generates a quantified representation of the degree of smoothness of each time-series dataset. In some examples, the smoothness evaluator 118 may compute an autocorrelation of each time-series dataset. For example, for a dataset X with n values X[i], i=1 . . . n, the autocorrelation of X can be computed between two versions of X, one delayed with respect to the other. For instance, for $A=\{X_1, \ldots, X_{n-1}\}$; $B=\{X_2, \ldots, X_n\}$:

$$r_{AB} = \frac{\text{cov}(A, B)}{\sigma_A \sigma_B} = \frac{\sum_{i=1}^{n-1}(A_i - \overline{A})(B_i - \overline{B})}{\sqrt{\sum_{i=1}^{n-1}(A_i - \overline{A})^2} \sqrt{\sum_{i=1}^{n-1}(B_i - \overline{B})^2}}$$

with $\overline{A}$ and $\overline{B}$ being the mean of A and B, respectively; and with $\sigma_A$ and $\sigma_B$ being the standard deviation of A and B, respectively. The autocorrelation $r_{AB}$ is a quantified representation of the degree of smoothness of the time-series dataset X. Other measures of smoothness may be used in some examples. For example, the smoothness evaluator 118 may divide a time-series dataset into a set of time bins and compute standard deviations of the values within each time bin. The standard deviations may be used in combination with the average value in each bin and/or the domain of the data values of the time-series dataset to estimate the degree of smoothness of the time-series dataset.

The process selector 120 may select a temporal alignment process based on the degrees of smoothness determined by the smoothness evaluator 118. In some examples, the process selector 118 may compare the degrees of smoothness (e.g. autocorrelations) with a threshold to distinguish between datasets that are smooth and those that are noisy (i.e. not smooth). A time-series dataset that is smooth may have a degree of smoothness exceeding the threshold, and a time-series dataset that is noisy may have a degree of smoothness not exceeding the threshold. The process selector 120 may then select a temporal alignment process that is suitable for processing the two time-series datasets based on the degree of smoothness of each. In practice, such selection may be based on whether each of the two time-series datasets is in one of two states: smooth or noisy, as determined by the threshold comparison. For example, for two arbitrary time-series datasets, the degrees of smoothness determined by the smoothness evaluator 116 may indicate either: (1) both are smooth, (2) both are noisy, or (3) one is smooth and the other is noisy. The process selector 120 may select among 3 possible temporal alignment processes depending an which of the three smoothness states the two time-series datasets are in. For instance, the process selector 120 may allow smooth time-series datasets to be processed using interpolation techniques, but not allow such processing for datasets which are not smooth. Some examples of selections that may be made by the process selector 120 are described below in connection with FIG. 6, for example.

For examples in which the degree of smoothness is an autocorrelation a threshold of approximately 0.8 may be used to distinguish between time-series datasets which are smooth and those that are noisy. The precise value used for the threshold may depend on the nature of the time-series datasets, the trends represented, and/or the data source(s) from which the time-series datasets originate. In practice, a skilled administrator may tune the smoothness threshold based on such factors and/or based on observed performance to achieve an automated temporal alignment process that sensibly distinguishes between smooth and noisy time-series datasets. Moreover, for other measures of degrees of smoothness, other thresholds may be used. In some cases, the quantified representation of the degree of smoothness generated by the smoothness evaluator 118 may be greater for greater extents of smoothness (e.g., a ratio of average standard deviation compared to domain). In these examples, the process selector 120 may recognize values less than a threshold as indicating a smooth dataset and values greater than the threshold as indicating a not smooth time-series dataset.

The dataset aligner 122 may temporally align the time-series datasets 106, according to the process selected by the process selector 120. Example temporal alignment techniques are described in detail in connection with FIG. 6.

The dataset correlator 124 may determine values indicative of degrees of similarity between each of the pairwise combinations of temporally aligned time-series datasets 106. For example, the dataset correlator 124 may analyze two temporally aligned time-series datasets 106 to determine the degree of correlation between the time-series datasets 106. One example measure of correlation is the Pearson product-moment correlation coefficient, which is also referred to as the PPMCC, Pearson's r, or the PCC. The PCC is a normalized measure of the linear correlation between two sets of data. For any two time-series datasets, the PCC is always between +1 and −1 inclusive, A PCC of +1 indicates total positive correlation, 0 indicates no correlation, and −1 indicates total negative correlation. While correlation does not always prove causation, a strong correlation between trio datasets can be a useful tool when analyzing, multiple data steams to identify relationships between different quantities.

In some examples, the dataset correlator 124 may generate PCCs for each independent pair of multiple aligned time-series datasets. The PCCs for each independent pair can be used to infer relationships between various time-series datasets. For example, the degree of correlation between datasets for measurements and/or metrics related to system performance may be used to infer relationships between those measurements and/or metrics.

The dataset deduplicator 126 may deduplicate pairs of time-series datasets which the dataset correlator 124 determines as exhibiting a correlation whose absolute value exceeds a correlation threshold. "Deduplication" as used herein means that one of the two (e.g. correlated) time-series datasets may be removed (e.g. deleted), or may be ignored (e.g. designated as not to be used in subsequent operations including proportion determination using the proportion determiner 128).

In some examples, the correlation threshold may be 0.99 (99%). Thus, if the correlations either greater than 0.99 or less than −0.99, then the absolute value of the correlation may exceed the correlation threshold of 0.99. By using the absolute value of the correlation when comparing with the correlation threshold, time-series datasets measuring the same metric as well as reciprocal metrics may be identified. For example, the correlation exceeding 0.99 may indicate that the time-series datasets represent the same metric such as memory used, whereas the correlation being less than −0.99 (and therefore the absolute value of the correlation exceeding 0.99) may indicate that the time-series datasets represent reciprocal metrics such as memory used and free memory.

The precise value used for the correlation threshold may depend on the nature of the time-series datasets, the trends represented, and/or the data source(s) from which the time-series datasets originate. In practice, a skilled administrator may tune the correlation threshold based on such factors and/or based on observed performance to achieve an automated deduplication process that sensibly distinguishes between correlated and non-correlated time-series datasets. Moreover, depending on the measure correlation (PCC or other measure), different correlation thresholds may be used.

The proportion determiner 128 may determine a proportion of non-deduplicated time-series datasets 106 in which a breach has occurred relative to non-deduplicated time-series datasets 106 in which a breath has not occurred.

In an example, 10 time-series datasets 106 may be received by the dataset receiver 112. Of these, 4 time-series datasets 106 may have exhibited a breach. In an example, 1 of the time-series datasets 106 exhibiting a breach may have been deduplicated, and 1 of the time-series datasets 106 not exhibiting a breach may have been deduplicated. This may leave 8 non-deduplicated time-series datasets 106, 3 in which a breach has occurred and 5 in which a breach has not occurred. Therefore, in this example, the proportion of non-deduplicated time series datasets 106 in which a breach has occurred relative to non-deduplicated time-series datasets 106 in which a breach has not occurred may be 3:5 if expressed as a ratio. In another example, the proportion may be expressed as a percentage, for example 37.5 percent of the non-deduplicated time-series datasets 106 may exhibit a breach. Any other suitable way of expressing the proportion may be used.

The anomaly determiner 130 may determine whether the anomaly has occurred in the system 100 based on the proportion. For example, the anomaly determiner 130 may determine that the anomaly has occurred in at least one of the data sources 102 of the system 100 in response to the proportion exceeding a threshold, and that the anomaly has not occurred in at least one of the data sources 102 of the system 100 in response to the proportion not exceeding the threshold. For example, if the proportion is expressed as a percentage, the threshold may be 20 percent. Then, if as in the earlier example the determined proportion is 37.5 percent, then the anomaly determiner 130 may determine that an anomaly has occurred.

In some examples, identification of multiple non-deduplicated time-series datasets 106 as exhibiting a breach, with a sufficiently high prevalence of such time-series datasets 106 within the larger set of non-deduplicated time-series datasets 106 received from the data sources 102, may provide a sufficient degree of confidence that an anomaly has been correctly identified without a false positive.

In some examples, the analysis system 108 may receive, from the anomaly determination system 110, output data 132 representing whether the anomaly has occurred and representing any other data generated through the processes implemented by the system 100. The output data 132 may be represented on a user interface to include charts, graphs, and/or other graphics for visualizing the received output data 132. Providing visualization could help the administrator when analyzing anomalies and any other relationships in the data. Thus, the analysis system 108, with e.g. the help of a network administrator, may work to resolve issues causing the anomaly.

Figure 5:
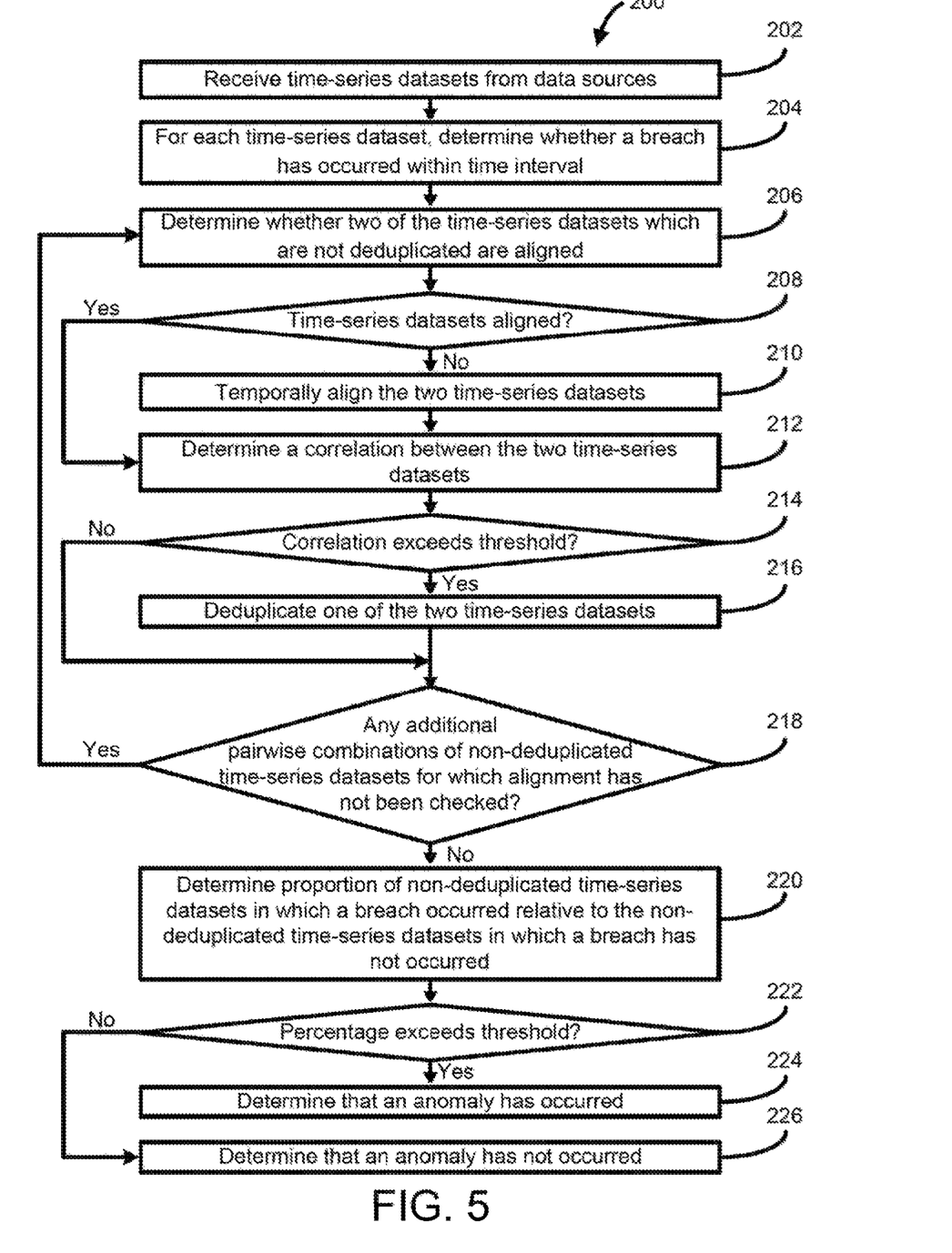

FIG. 5 is a flow diagram illustrating a method 200, according to some examples. In some examples, the orderings shown may be varied, some elements may occur simultaneously, some elements may be added, and some elements may be omitted. In describing FIG. 5, reference will be made to elements described in FIG. 4. In examples, any of the elements described earlier relative to FIG. 4 may be implemented in the process shown in and described relative to FIG. 5.

At 202, the dataset receiver 112 may receive time-series datasets 106 from the data sources 102a-b. Any processes previously described as implemented by the dataset receiver 112 may be implemented at 202.

At 204, the breach determiner 114 may, for each of the received time-series datasets 106, determine whether a breach has occurred in the time-series dataset 106. Any processes previously described as implemented by the breach determiner 114 may be implemented at 204.

At 206, the alignment determiner 116 may determine whether two of the time-series datasets 106 which have not been deduplicated by the dataset deduplicator 126 are temporally aligned. As discussed earlier, the alignment determiner 116 may perform the determination for each pairwise combination of time-series datasets through iterations of 206 to 218. As will be discussed, at 218 the method 200 may return to 206 to check temporal alignment of any additional pairwise combinations of non-deduplicated time-series datasets 106 that have not already been checked.

As discussed earlier, in some examples, rather than determining temporal alignment for each pairwise combination of the received time-series datasets 106, the alignment determiner 116 may instead determine temporal alignment of each pairwise combination of time-series datasets in which breaches occurred in both time-series datasets of the pairwise combination, and may not determine temporal alignment of pairwise combinations of time-series datasets a breach did not occur in at least one of the two time-series datasets.

Any processes previously described as implemented by the alignment determiner 116 may be implemented at 206.

At 208, if the two time-series datasets 106 analyzed at 206 are aligned, the method 200 may proceed to 212. If the two time-series dataset 106 analyzed at 206 are not aligned, the method 200 may proceed to 210.

At 210, the smoothness evaluator 118, process selector 120, and dataset aligner 122 may be used to temporally align the time-series datasets 106 analyzed at 206. Any processes previously described as implemented by the dataset receiver 112 may be implemented at 202. In some examples, the method 300 which will be described in detail in connection with FIG. 6 may be performed at 210.

At 212, the dataset correlator 124 may determine values indicative of degrees of similarity between each of the pairwise combinations of temporally aligned time-series datasets 106. For example, the dataset correlator 124 may analyze two temporally aligned time-series datasets 106 to determine the degree of correlation between the time-series datasets 106. Any processes previously described as implemented by the dataset correlator 124 may be implemented at 212.

At 214, if the absolute value of the correlation, as described earlier relative to FIG. 4 and the dataset correlator 124, exceeds a correlation threshold, then the method 200 may proceed to 216. If the absolute value of the correlation, as described earlier relative to FIG. 4 and the dataset correlator 124, does not exceed the correlation threshold, then the method 200 may proceed to 218.

At 216, the dataset deduplicator 126 may deduplicate the pair of time-series datasets 106 which the dataset correlator 124 determines as exhibiting a correlation whose absolute value exceeds a correlation threshold. Any processes previously described as implemented by the dataset deduplicator 126 may be implemented at 216.

At 218, if the alignment determiner 116 determines that it has already performed the temporal alignment determination for each pairwise combination of time-series datasets 106 that have not been deduplicated or have yet to be deduplicated, the method 200 may proceed to 220. If the alignment determiner 116 determines that it has not performed the temporal alignment determination for each pairwise combination of time-series datasets 106 that have not been deduplicated or have yet to be deduplicated, then the method 200 may proceed to 206.

At 220, the proportion determiner 128 may determine a proportion of non-deduplicated time-series datasets 106 in which a breach has occurred relative to non-deduplicated time-series datasets 106 in which a breach has not occurred. Any processes previously described as implemented by the proportion determiner 12 may be implemented 220.

At 222, the anomaly determiner 130 may determine whether the proportion exceeds a threshold. If the anomaly determiner 130 determines that the proportion exceeds the threshold, the method may proceed to 224. If the anomaly determiner 130 determines that the proportion does not exceed the threshold, the method may proceed to 226.

For example, the anomaly determiner 130 may determine that the anomaly has occurred in at least one of the data sources 102 of the system 100 in response to the proportion exceeding a threshold, and that the anomaly has not occurred in at least one of the data sources 102 of the system 100 in response to the proportion not exceeding the threshold.

At 224, the anomaly determiner 130 may determine that an anomaly has occurred in at least one of the data sources 102 of the system 100 in response to the proportion exceeding the threshold.

At 226, the anomaly determiner 130 may determine that an anomaly has not occurred in at least one of the data sources 102 of the system 100 in response to the proportion not exceeding the threshold.

Any processes previously described as implemented by the anomaly determiner 130 may be implemented at 222, 224, and 226.

Figure 6:
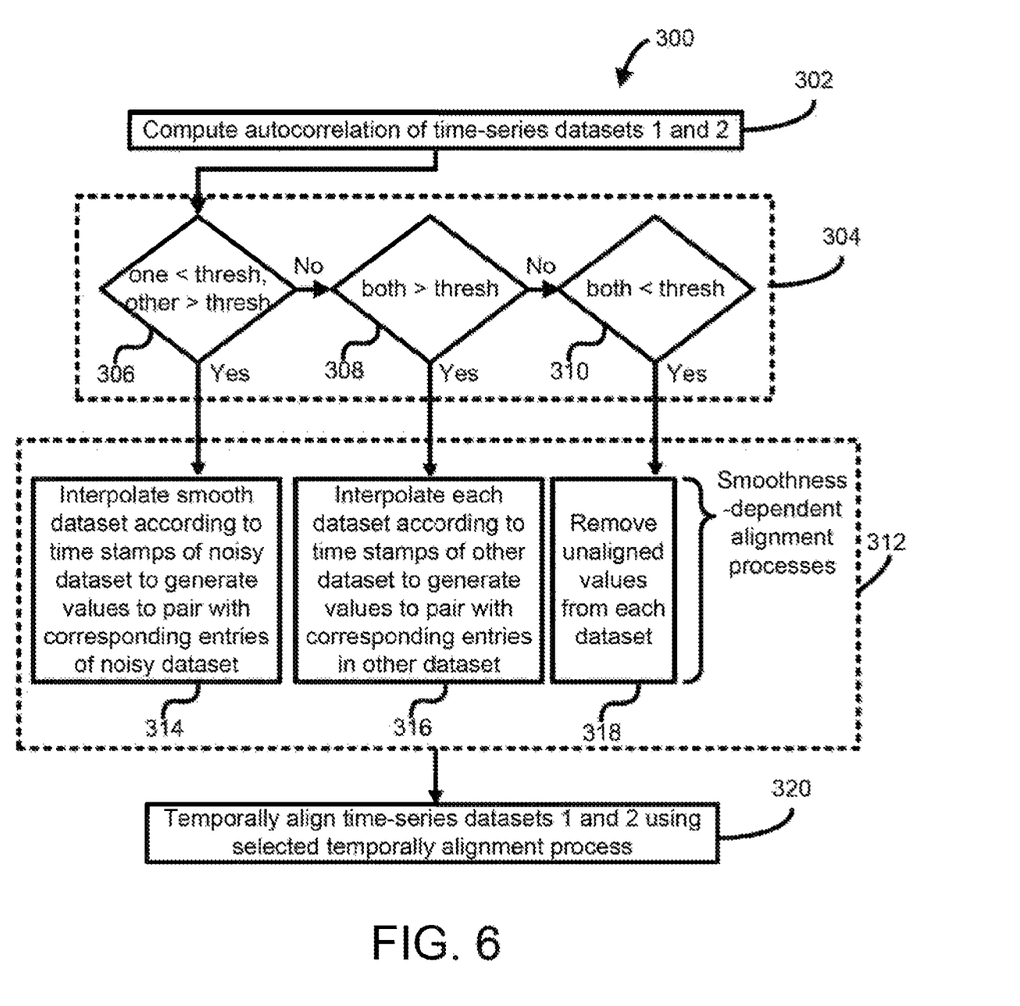

FIG. 6 is a flow diagram illustrating a method 300 according to some examples. In some examples, the orderings shown may be varied, some elements may occur simultaneously, some elements may be added, and some elements may be omitted. In describing FIG. 6, reference will be made to elements described in FIG. 4. In examples, any of the elements described earlier relative to FIG. 4 may be implemented in the process shown in and described relative to FIG. 6.

At 302, the smoothness evaluator 118 may determine a degree of smoothness of the two time-series datasets of a given pairwise combination. The smoothness evaluator 118 may perform an analysis on each time-series dataset that generates a quantified representation of the degree of smoothness of each time-series dataset. In some examples, the smoothness evaluator 118 may compute an autocorrelation of each time-series dataset. Any processes previously described as implemented by the smoothness evaluator 118 may be implemented at 302.

The two time-series datasets each may include a set of data values each associated with a respective time stamp, and each data value may be indicative of measurements and/or metrics obtained at a times indicated by its respective time stamp. In examples, at least a portion of the two time-series datasets may span an overlapping time interval. For instance, the time stamps of the first, time-series dataset may span a first time interval, and the time stamps of the second time-series dataset may span a second time interval which at least partially overlaps the first time interval. The temporal alignment of time-series datasets may be applied to the portions of the time-series datasets that with overlapping time intervals relative to each other. Thus, time-aligned values may be generated within the portions of the time-series datasets having overlapping time intervals (e.g., the time-series datasets may have respective data values associated with a common time stamp or time stamps within a temporal tolerance of one another).

The remaining description of the method 300 assumes that the two time-series datasets are from an overlapping interval (i.e., approximately equal earliest and latest time stamps), although in some examples one or both of the two time-series datasets may be truncated to achieve these conditions. In some examples, the overlapping time interval can be defined as the time spanned from the later one of the earliest time stamps in time-series datasets to the earlier one of the latest time stamps in time-series datasets.

As discussed above, the two time-series datasets may not be aligned in time (i.e., the sequence of time stamps of each will not be identical). The two time-series datasets may have different measurement intervals. For example, the first time-series dataset may have data values spaced by about 0.5 seconds and the second time-series dataset may have values spaced by about 0.8 seconds. In some examples, the two time-series datasets may have a measurement offset with respect to one another. For example, the time-series datasets may have the same time spacing of about 0.5 seconds, but the first time-series dataset may begin at time 0, and the second time-series dataset may begin at time 0.2 seconds, such that each time stamp in the second time-series dataset is about 0.2 seconds later than the nearest one in first time series dataset. In some examples, one or both of the time-series datasets may not have periodic time stamps, such that data values are obtained at regular time intervals. Further still, one or both of the time-series datasets may have missing points, such as due to a communication disruption, a faulty sensor, a value out of range, or another state resulting in a non-value (e.g., NAN) becoming associated with some time stamps.

At 304, the degrees of smoothness can be compared with a threshold. The comparison with the threshold may result in each of the two time series datasets being characterized as either smooth or not smooth. As described above, in an example in which the degree of smoothness determined at 302 is an autocorrelation, the threshold may be about 0.8, with greater values indicating smooth time-series datasets and lesser values indicating not smooth (noisy) time-series datasets.

At 304, one of a group of multiple temporal alignment processes 312 may be selected based on the comparison with the threshold. For instance, based on the comparison, the process selector 120 may determine whether the two time-series datasets are one of three possible states, either: (1) one smooth and one noisy; (2) both smooth; or (3) both noisy. The process selector 120 may then select among three pre-determined smoothness-dependent temporal alignment processes 312 that each correspond to a respective one of the three possible smoothness states.

In some examples, autocorrelations of the time-series datasets may be used as a basis to select from among multiple temporal alignment processes 312. For example, the process selector 120 can compare the autocorrelations with a threshold, and determine whether: (1) one autocorrelation is above the threshold and the other is below (306); (2) the two autocorrelations are both greater than the threshold (308); or (3) the two autocorrelations are both less than the threshold (310). Because the autocorrelation is greater for data which is smoother, comparing the autocorrelations with the threshold can be used to characterize the datasets as either smooth or noisy. For instance, if block 306 is true (one above the threshold, the other below), then one dataset may be considered smooth and the other not smooth. If block 308 is true (both above the threshold), then both datasets may be considered smooth. If block 310 is true (both below the threshold), then, both datasets may be considered not smooth.

Each of the three states 306, 308, and 310 correspond to one of the smoothness-dependent alignment processes 312. As shown in FIG. 6, one autocorrelation above the threshold and the other below (306) corresponds to a first process 314; both being greater than the threshold (308) corresponds to a second process 316; and both less than the threshold (310) corresponds to a third process 318. Depending on which of 306, 308, and 310 is true, a respective one of the multiple alignment processes 314, 316, and 318 may be selected (e.g., by the process selector 120).

At 314, 316, or 318, the dataset aligner 122 may temporally align the tune-series according to the selected process 314, 316, or 318.

The first process 518 may correspond to a smoothness state in which one time-series dataset is smooth, and the other is noisy. The first process 518 may involve interpolating between data values of the smooth dataset according to time stamps of the noisy time-series dataset to generate paired data values at each time stamp of the noisy dataset. For example, if the first time-series dataset is smooth and the second time-series dataset is noisy, data values of the first time-series dataset near a given time stamp of the second time-series dataset may be interpolated at the given time stamp to generate an interpolated data value that can be paired with the data value of the second time-series dataset associated with the same time stamp.

The second process 520 may correspond to a smoothness state in which both time-series datasets are smooth. The second process 518 may involve interpolating each time-series dataset according to time stamps of the other time-series dataset to generate paired data values at each time stamp. For example, data values of the first time-series dataset having time stamps near a time stamp of the second time-series dataset may be interpolated to generate an interpolated data value that can be paired with the value of the second time-series dataset associated with the same time stamp. Similarly, data values of the second time-series dataset having time stamps near a time stamp of the first time-series dataset may be interpolated to generate an interpolated data value that can be paired with the data value of the first time-series dataset associated with the same time stamp.

The third process 522 may correspond to a smoothness state in which both datasets are noisy. The third process 522 may involve removing unaligned data values from each time-series dataset. For example, a temporal tolerance may be determined based on spacings between consecutive time stamps in the two time-series datasets. Data values from the two time-series datasets that are within the temporal tolerance of one another can be identified and paired for inclusion in the time-series dataset after alignment, while the remaining data values may be removed. Determining the temporal tolerance may involve computing a representative time spacing between consecutive time stamps in the first time-series dataset such as a median spacing, mean spacing, minimum spacing, maximum spacing, etc. A representative time spacing, between consecutive time stamps in the second time-series dataset such as a median spacing, mean spacing, minimum spacing, maximum spacing, etc. may also be computed. The temporal tolerance may then be determined based on the two representative time spacings. In some cases, the temporal tolerance may be 20% of the lesser of the median time spacings of the two time-series datasets. However, other temporal tolerance values may be arrived by using a different fraction of the lesser median (e.g., between about 10% and about 50%) and/or by selecting another manner of computing the representative time spacing such as a mean time spacing. Moreover, in some examples, the temporal tolerance may be based on individual ones of the time spacings between consecutive time stamps in one or both time-series datasets rather than a single representative time spacing. For instance, the temporal tolerance may be based on a population distribution of the time spacings in one or both time-series datasets. In some cases, the temporal tolerance may be equal to some fraction of a time spacing in a particular percentile of the distribution. Upon determining the temporal tolerance, the two time-series datasets can be analyzed to identify pairs of time stamps, with one in each time-series dataset, that are within the temporal tolerance of one another. The values of each dataset dated with those time stamps can be identified as a pair for inclusion in the datasets after alignment.

Aspects of temporal alignment processes such as those described in U.S. patent application Ser. No. 14/795,280 filed on Jul. 9, 2015, entitled "VARIANCE BASED TIME SERIES DATASET ALIGNMENT", the entire contents of which are hereby incorporated herein by reference, may be used as well.

Any of the processors discussed herein may comprise a microprocessor a microcontroller, a programmable gate array, an application specific integrated circuit (ASIC), a computer processor, or the like. Any of the processors may, for example, include multiple cores on a chip, multiple cores across multiple chips, multiple cores across multiple devices, or combinations thereof. In some examples, any of the processors may include at least one integrated circuit (IC), other control logic, other electronic circuits, or combinations thereof. Any of the non-transitory computer-readable storage media described herein may include a single medium or multiple media. The non-transitory computer readable storage medium may comprise any electronic, magnetic, optical, or other physical storage device. For example, the non-transitory computer-readable storage medium may include, for example, random access memory (RAM), static memory, read only memory, an electrically erasable programmable read-only memory (EEPROM), a hard drive, an optical drive, a storage drive, a CD, a DVD, or the like.

All of the features disclosed in this specification (including any accompanying claims, abstract and drawings), and/or a of the elements of any method or process so disclosed, may be combined in any combination, except combinations where at least some of such features and/or elements are mutually exclusive.

In the foregoing description, numerous details are set forth to provide an understanding of the subject disclosed herein. However, examples may be practiced without some or all of these details. Other examples may include modifications and variations from the details discussed above. It is intended that the appended claims cover such modifications and variations.

The invention claimed is:

1. A non-transitory computer-readable storage medium comprising instructions executable by a processor to:
   temporally align a group of time-series datasets received from a system;
   determine a correlation between a first time-series dataset and a second time-series dataset from the temporally aligned group of time-series datasets;
   determine whether an absolute value of the correlation exceeds a correlation threshold;
   in response to a determination that the absolute value of the correlation exceeds the correlation threshold, remove the second time-series dataset from the temporally aligned group of time-series datasets to obtain a reduced temporally aligned group of time-series datasets; and
   identify an anomaly that has occurred in the system based on the reduced temporally aligned group of time-series datasets.

2. The non-transitory computer-readable storage medium of claim 1 further comprising instructions executable by the processor to, for each time-series dataset of the group of time-series datasets, determine whether a breach has occurred in the time-series dataset.

3. The non-transitory computer-readable storage medium of claim 2 wherein the instructions to temporally align comprise instructions executable by the processor to temporally align the group of time-series datasets in response to a determination that the breach has occurred in each time-series dataset of the group of time-series datasets.

4. The non-transitory computer readable storage medium of claim 1 further comprising instructions executable by the processor to determine the correlation using a Pearson product-moment correlation coefficient.

5. The non-transitory computer-readable storage medium of claim 2 further comprising instructions executable by the processor to:
   determine, for the reduced temporally aligned group of time-series datasets, a proportion of the time-series datasets in which the breach has occurred relative to the time-series datasets in which the breach has not occurred; and
   determine whether the anomaly has occurred in the system based on the proportion.

6. The non-transitory computer-readable storage medium of claim 5 wherein the instructions to determine whether the anomaly has occurred based on the proportion comprise instructions executable by the processor to:
   in response to the proportion exceeding a proportion threshold, determine that the anomaly has occurred in the system; and
   in response to the proportion not exceeding the proportion threshold, determine that the anomaly has not occurred in the system.

7. The non-transitory computer-readable storage medium of claim 1 further comprising instructions executable by the processor to:
   determine a correlation between each pair of time-series datasets in the temporally aligned group of time-series datasets;
   for each pair:
      determine whether an absolute value of the correlation between the pair exceeds the correlation threshold; and
      in response to a determination that the absolute value of the correlation between the pair exceeds the correlation threshold, remove one time-series dataset of the pair from the temporally aligned group of time-series datasets.

8. The non-transitory computer-readable storage medium of claim 1 further comprising instructions executable by the processor to receive the group of time-series datasets from data sources in the system,
   the system being a computer network.

9. The non-transitory computer-readable storage medium of claim 1 wherein the instructions to temporally align comprise instructions executable by the processor to:
   determine a first degree of smoothness of the first time-series dataset and a second degree of smoothness of the second time-series dataset;
   compare each of the first and second degrees of smoothness with a smoothness threshold;
   select one of a plurality of temporal alignment processes based on the comparisons of the first and second degrees of smoothness with the smoothness threshold; and
   process at least one of the first and second time-series datasets according to the selected one of the plurality of temporal alignment processes such that a first set of data values in the first time-series dataset become temporally aligned with a second set of data values in the second time-series dataset.

10. The non-transitory computer-readable storage medium of claim 9 wherein:
   the plurality of temporal alignment processes comprises:
      a first process corresponding to the first and second degrees of smoothness exceeding the smoothness threshold,
      a second process corresponding to the first degree of smoothness exceeding the smoothness threshold and the second degree of smoothness not exceeding the smoothness threshold, and
      a third process corresponding to the first and second degrees of smoothness not exceeding the smoothness threshold, and
   the non-transitory computer-readable storage medium comprises instructions executable by the processor to select among the first, second, or third processes based on a correspondence between the selected process and the first and second degrees of smoothness.

11. The non-transitory computer-readable storage medium of claim 9, wherein the instructions to select comprise instructions executable by the processor to, in response to the first degree of smoothness exceeding the smoothness threshold, select the one of the plurality of temporal alignment processes,
   wherein the selected one of the plurality of temporal alignment processes comprises generating an interpolated data value associated with a first time stamp of the first time-series dataset based on a second time stamp of the second time-series dataset, the first and second time stamps having a same time value.

12. The non-transitory computer-readable storage medium of claim 9, wherein the instructions to select comprise instructions executable by the processor to, in response to the first and second degrees of smoothness exceeding the smoothness threshold, select the one of the plurality of temporal alignment processes,
wherein the selected one of the plurality of temporal alignment processes comprises:
generating a first interpolated data value associated with a first time stamp of the first time-series dataset based on a second time stamp of the second time-series dataset, the first and second time stamps having a first same time value; and
generating a second interpolated data value associated with a third time stamp of the second time-series dataset based on a fourth time stamp of the first time-series dataset, the third and fourth time stamps having a second same time value.

13. The non-transitory computer-readable storage medium of claim 9 wherein the instructions to select comprise instructions executable by the processor to, in response to the first and second degrees of smoothness not exceeding the smoothness threshold, select the one of the plurality of temporal alignment processes,
wherein the selected one of the plurality of temporal alignment processes comprises:
determining a temporal tolerance based on time spacings between consecutive time stamps in the first and second time-series datasets;
identifying pairs of time stamps in the first and second time-series datasets that are within the determined temporal tolerance of each another; and
including paired data values in the first and second time-series datasets associated with the identified pairs of time stamps.

14. A system comprising:
a processor; and
a memory comprising instructions executable by the processor to:
temporally align a group of time-series datasets received from a data source;
determine a correlation between a first time-series dataset and a second time-series dataset from the temporally aligned group of time-series datasets;
determine whether an absolute value of the correlation exceeds a correlation threshold;
in response to a determination that the absolute value of the correlation exceeds the correlation threshold, remove the second time-series dataset from the temporally aligned group of time-series datasets to obtain a reduced temporally aligned group of time-series datasets; and
determine that an anomaly has occurred in the data source based on the reduced temporally aligned group of time-series datasets.

15. A method comprising:
by a processor:
temporally aligning pairwise combinations of time-series datasets of a group of time-series datasets representing at least one metric of a monitored system;
determining a correlation between a first time-series dataset and a second time-series dataset from the temporally aligned group of time-series datasets;
determining whether an absolute value of the correlation exceeds a correlation threshold;
in response to a determination that the absolute value of the correlation exceeds the correlation threshold, removing the second time-series dataset from the temporally aligned group of time-series datasets to obtain a reduced temporally aligned group of time-series datasets; and
identifying an anomaly associated with the at least one metric of the monitored system based on the reduced temporally aligned group of time-series datasets.

16. The method of claim 15, comprising:
determining, for the reduced temporally aligned group of time-series datasets, a proportion of the time-series datasets in which a breach has occurred relative to the time-series datasets in which the breach has not occurred; and
determining whether the anomaly has occurred in the system based on the proportion.

17. The method of claim 16, wherein determining whether the anomaly has occurred comprises:
in response to the proportion exceeding a proportion threshold, determining that the anomaly has occurred in the system.

18. The method of claim 16, wherein determining whether the anomaly has occurred comprises:
in response to the proportion not exceeding a proportion threshold, determining that the anomaly has not occurred in the system.

19. The system of claim 14, the instructions executable by the processor to:
determine, for the reduced temporally aligned group of time-series datasets, a proportion of the time-series datasets in which a breach has occurred relative to the time-series datasets in which the breach has not occurred; and
determine whether the anomaly has occurred in the system based on the proportion.

20. The system of claim 19, the instructions executable by the processor to:
in response to the proportion exceeding a proportion threshold, determine that the anomaly has occurred in the system; and
in response to the proportion not exceeding the proportion threshold, determining that the anomaly has not occurred in the system.

* * * * *